(12) United States Patent
Kirby

(10) Patent No.: US 6,495,832 B1
(45) Date of Patent: Dec. 17, 2002

(54) PHOTOELECTRIC SENSING ARRAY APPARATUS AND METHOD OF USING SAME

(75) Inventor: Joseph John Kirby, Carlsbad, CA (US)

(73) Assignee: Touch Controls, Inc., San Diego, CA (US)

( * ) Notice: Subject to any disclaimer, the term of this patent is extended or adjusted under 35 U.S.C. 154(b) by 0 days.

(21) Appl. No.: 09/528,789

(22) Filed: Mar. 15, 2000

(51) Int. Cl.[7] .............................. G08C 9/00; F41J 5/02
(52) U.S. Cl. .................................. 250/341.7; 250/222.2
(58) Field of Search ..................... 250/341.7, 222.2, 250/221; 187/317; 273/348

(56) References Cited

U.S. PATENT DOCUMENTS

| | | | | |
|---|---|---|---|---|
| 4,672,364 A | * | 6/1987 | Lucas | 340/365 |
| 4,891,508 A | | 1/1990 | Campbell | 250/221 |
| 4,893,120 A | | 1/1990 | Doering et al. | 341/31 |
| 4,904,857 A | | 2/1990 | Ando et al. | 250/205 |
| 4,928,094 A | | 5/1990 | Smith | 340/712 |
| 5,162,783 A | | 11/1992 | Moreno | 340/712 |
| 5,579,035 A | | 11/1996 | Beiswenger | 345/169 |
| 5,988,645 A | * | 11/1999 | Downing | 273/348 |

* cited by examiner

Primary Examiner—Constantine Hannaher
Assistant Examiner—Otilia Gabor
(74) Attorney, Agent, or Firm—Foley & Lardner; Bernard L. Kleinke

(57) ABSTRACT

A photoelectric sensor array apparatus and method, relates to at least two photoelectric rail elements each having alternating light emitting diode transmitters and photo detecting receivers. The array produces a plurality of light devices with corresponding sensors, whereby the light beams are blocked in the region where an opaque object is located. Each rail contains both transmitters and receivers so that control circuits for the transmitters and receivers are substantially identical and mounted on opposite sides of the array apparatus, to provide a more compact unit of higher resolution and to reduce the design and manufacturing costs. Such construction and method enable the sensing array apparatus to function in direct sunlight or other such photoelectric saturation conditions, which would otherwise blind conventional light sensitive sensor arrays.

9 Claims, 7 Drawing Sheets

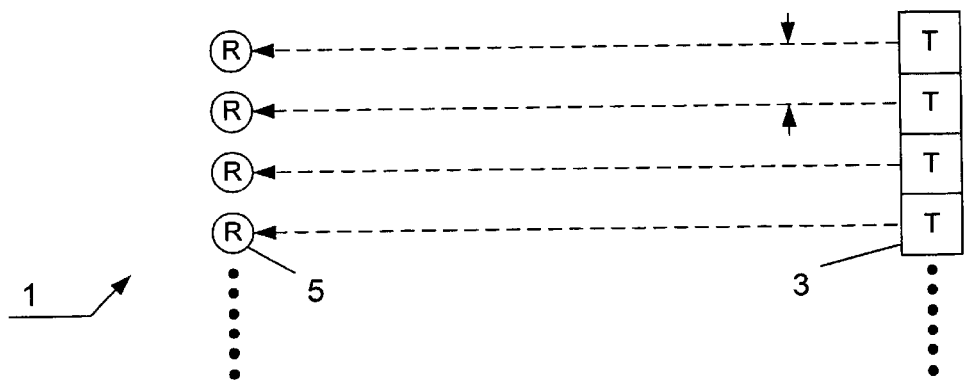
Closest Beam Spacing = Height or Diameter of Largest Component
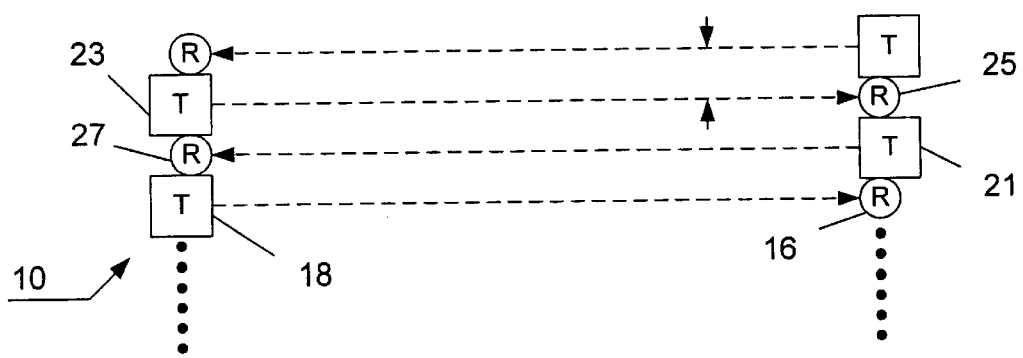
Closest Beam Spacing = 1/2(Height of T) + 1/2(Diameter of R)

Control Program Sequence

Pattern Check for
Sunblinded Receivers

Two Dimensional Sensor Array
with Mirrored Surfaces.

PHOTOELECTRIC SENSING ARRAY APPARATUS AND METHOD OF USING SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a photoelectric sensing array apparatus and a method of using it. More particularly, the present invention relates to position sensing of an opaque object located within a single or multi-dimensional array of infra red light beams.

2. Background Art

There are many known infra red (IR) sensor arrays used for position sensing by utilizing a row of infra red light emitting diode (LED) transmitters mounted on a rail, and a row of light sensing receivers (photo detectors) mounted on an opposite rail as illustrated in the diagram of FIG. 1. The position of an opaque object located between the transmitting array and the receiving array is determined by individually pulsing of the transmitter LED light sources while electronically sensing the response of the corresponding photo detectors.

The prior art array thus produces a multitude of invisible light beams, whereby corresponding sensors are blocked at the position where an opaque object is located. The center of the opaque object can be determined by electronically sensing current flow in each of the photo sensors, and then computing the center point of the region of blocked photo sensors.

Commonly this detection process is done in two axes simultaneously to create a two dimensional sensing grid such as found on a computer touch screen. Previous known sensor arrays of this type have the light emitting transmitters mounted on one rail and the photo detecting receivers mounted on the opposite rail. See U.S. Pat. Nos. 4,672,364; 4,841,141; 4,891, 508; 4,893,120; 4,904,857; 4,928,094; 5,162,783 and 5,579,035, which are each incorporated herein by reference.

There are serious drawbacks to this conventional method of photoelectric position sensing for some applications. The sensor array resolution is limited by the diameter of the largest optical component. In most applications, the LED transmitter dissipates much more power than the photo detector, and thereby requires a larger component package size. This configuration limits the resolution of the sensing array. For example, if the LED diameter is 0.25 inch and the photo detector diameter is 0.17 inch, the best attainable in-line array resolution, limited by the package size of the LED, is 4 points per inch. (See FIG. 2).

Conventional infra red light sensing arrays can give false readings or be blinded (photodetector saturation) by, for example, sunlight directed toward the receiving sensor rail. If the sensing is done across a horizontal plane, and if the IR light source is positioned on the bottom rail with the photo detectors on the top rail where they are typically shaded from the sunlight, the blinding problem can be somewhat ameliorated. The vertical plane however remains problematic, since throughout the course of a day, the sunlight can be directed toward either side of the array. Thus, blinding can still occur, and completely interfere with the desired operation of the array.

The design and production costs of multi-dimensional light beam arrays are high relative to other sensing technologies. For example, a two-dimensional touch-sensing array for a rectangular computer display typically requires four unique printed circuit cards. Thus, each one of the four circuits requires separate design and development, as well as production costs for assembling the circuits to the array, since each requires separate manufacturing techniques.

Thus, it would be highly advantageous to have a new and improved light sensing array which is relatively less expensive to manufacture, and which can be utilized at all times, even in direct sunlight. It would also be desirable to have a sensor array with a minimum or at least a greatly reduced number of different unique component assemblies to minimize or greatly reduce design time and reduce manufacturing costs.

SUMMARY OF THE INVENTION

It is, therefore, the principal object of the present invention to provide a new and improved photoelectric sensing array apparatus and method to increase the resolution of the array.

It is another object of the present invention to provide such a new and improved photoelectric sensing array apparatus and method, wherein the sensing array apparatus can still function even under certain extreme error conditions such as photo detector saturation caused by direct sunlight exposure.

It is yet another object of the present invention to provide such a new and improved photoelectric sensing array apparatus and method, wherein the array apparatus has a substantially reduced design and manufacturing cost.

Briefly, in accordance with the present invention, there is provided a new and improved photoelectric sensing array apparatus and method, which enable a sensing array to be constructed at a relatively low cost at improved resolution, and be able to function even under certain extreme error conditions such as photoelectric saturation caused by direct sunlight exposure.

A photoelectric sensor array apparatus and method, relates to at least two photoelectric rail elements each having alternating light emitting diode transmitters and photo detecting receivers. The array produces a plurality of light devices with corresponding sensors, whereby the light beams are blocked in the region where an opaque object is located. Each rail contains both transmitters and receivers so that control circuits for the transmitters and receivers are substantially identical and mounted on opposite sides of the array apparatus, to provide a more compact unit of higher resolution and to reduce the design and manufacturing costs. Such construction and method enable the sensing array apparatus to function in direct sunlight or other such photoelectric saturation conditions, which would otherwise blind conventional light sensitive sensor arrays.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIG. 2 is a diagram illustrating the linear resolution of the prior art sensing array of FIG. 1;

FIG. 4 is a diagram illustrating the linear resolution of the sensing array apparatus of FIG. 3 for comparison with the diagram of FIG. 2 of the prior art;

BEST MODE FOR CARRYING OUT THE INVENTION

Figure 1:
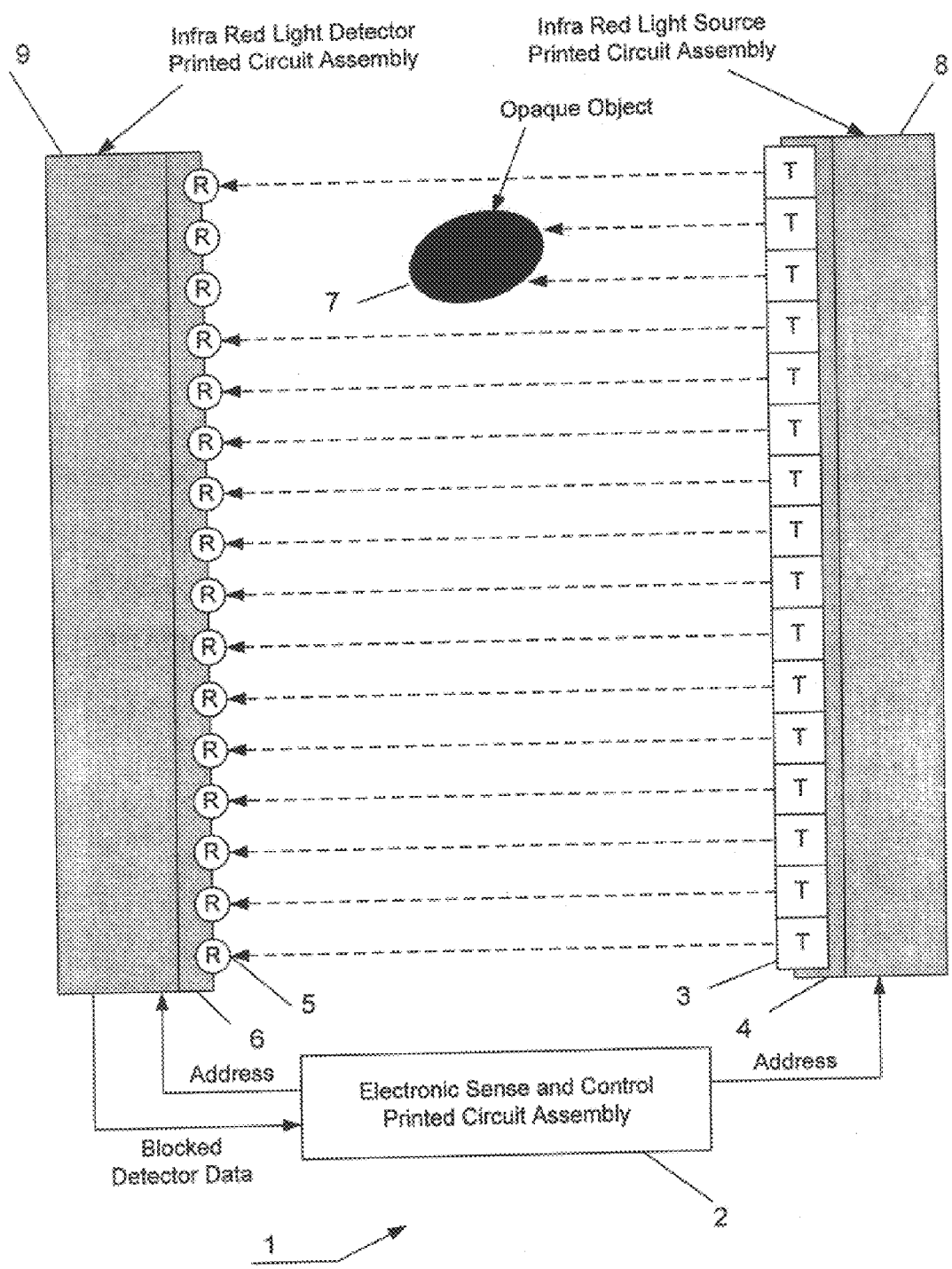
FIG. 1 is a diagrammatic view of a prior art linear infrared sensing array with infra red light source transmitters on one rail and light detecting receivers on the opposite, facing rail.

Referring now to the drawings, and more particularly to FIGS. 1 and 2, there is shown a conventional infra red (IR) sensor array 1, which is constructed in accordance with the teachings of the prior art, and which is used for position sensing. A row of infra red light emitting diode (LED) transmitters generally indicated at 3 are mounted on a rail 4. A row of light sensing receivers (photo detectors) generally indicated at 5 are mounted on an opposite rail 6. The position of an opaque object 7 located between the transmitters 3 and the receivers 5 is determined by individually pulsing the transmitters 3, while electronically sensing the response of the receivers 5.

An infra red light source printed circuit assembly 8 energizes selectively the transmitters 3 to produce a group of equally spaced apart invisible light beams directed toward individual ones of the receivers, whereby corresponding ones of the receivers are blocked at the position where the opaque object 7 is located. An infra red light detector printed circuit assembly 9 responds to each one of the receivers so that the center of the opaque object 7 can be determined by electronically sensing current flow in each one of the photo sensor receivers 5.

An electronic sense and control printed circuit assembly 2 provides address signals to the assemblies 8 and 9 to synchronize their operations. Also, the assembly 2 responds to a blocked detector data signal for computing the center point of the region of blocked receivers in accordance with known techniques. Such a sensor array is a single axis system, but a two axis system for creating a two dimensional sensing grid may be employed for certain applications such as a touch screen.

Figure 3:
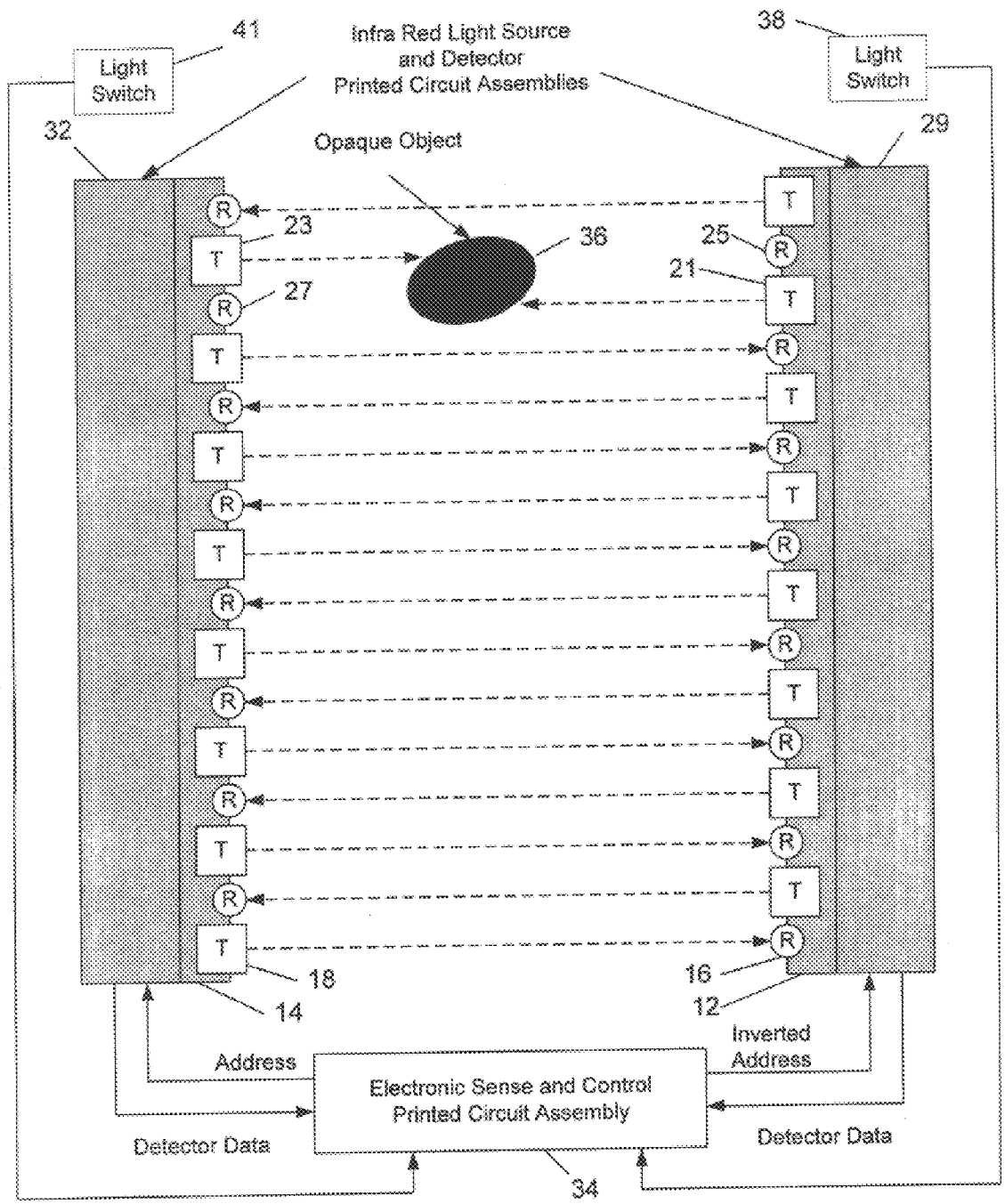
FIG. 3 is a diagrammatic view of a photoelectric sensing array apparatus, which is constructed in accordance with the present invention.

Referring now to FIGS. 3 and 4, there is shown a photoelectric sensing array apparatus 10, which is constructed in accordance with the present invention. The linear sensing array apparatus of FIG. 3 includes a pair of rails 12 and 14, each of which includes one of a pair of rows 16 and 18 of alternating IR light emitting diode transmitters generally indicated at 21 in row 16 and at 23 in row 18, and sensing receivers (photo detectors) generally indicated at 25 in row 16 and at 27 in row 18.

It can be seen from FIG. 3 that the right rail 12 has a similar printed circuit assembly of transmitters and receivers as compared to the left rail 14, but the rail 12 has been inverted by 180 degrees so that the transmitters of one rail are aligned with receivers of the opposite rail. For example, the transmitter 21 of the rail 12 is aligned with the receiver 27 of the rail 14 so that an opaque object 36 can block the light from the transmitter 21 from being received by the receiver 27. It will be seen that both rails 12 and 14 can use the same electronic printed circuit card if the LED transmitters and detector addressing lines are logically inverted on one of the rails. Thus, a cost savings for both design and manufacture is realized.

Referring now to FIG. 4, since the optical components are in an alternating pattern, the minimum light beam spacing is less than the diameter of the largest component. It is one-half (½) the sum of the larger component and the smaller component.

As shown in FIG. 3, when a strong external light source, such as direct sunlight, is directed at one rail of the array 10, either one of sun sensing switches 38 or 41 is triggered to provide a sunblind signal to a control assembly 34 to cause it to ignore the receivers on that side of the array and accept position data only from the opposite side. The switches are positioned adjacent to the corresponding assemblies 29 and 32. According to the invention, this cuts the effective resolution of the apparatus 10 in half during the blinded period, but enables it to remain functional.

A person skilled in the art will recognize that the photoelectric switches 38 and 41 can be implemented in hardware by using directional ambient light sensors. Another method employs software pattern sensing of the existing sensor data from each side. With systems using a micro controller, pattern sensing is preferred, because it can also be used to detect and ignore faulty components. The software for pattern sensing in hereinafter described in greater detail (when software is used then the hardware switches 38 and 41 need not be used).

For applications such as indoor touch screens (not shown) that do not require protection against direct sunlight, the same IR source and detector assemblies can be used with mirrored surfaces to reduce overall system costs.

Figure 5:
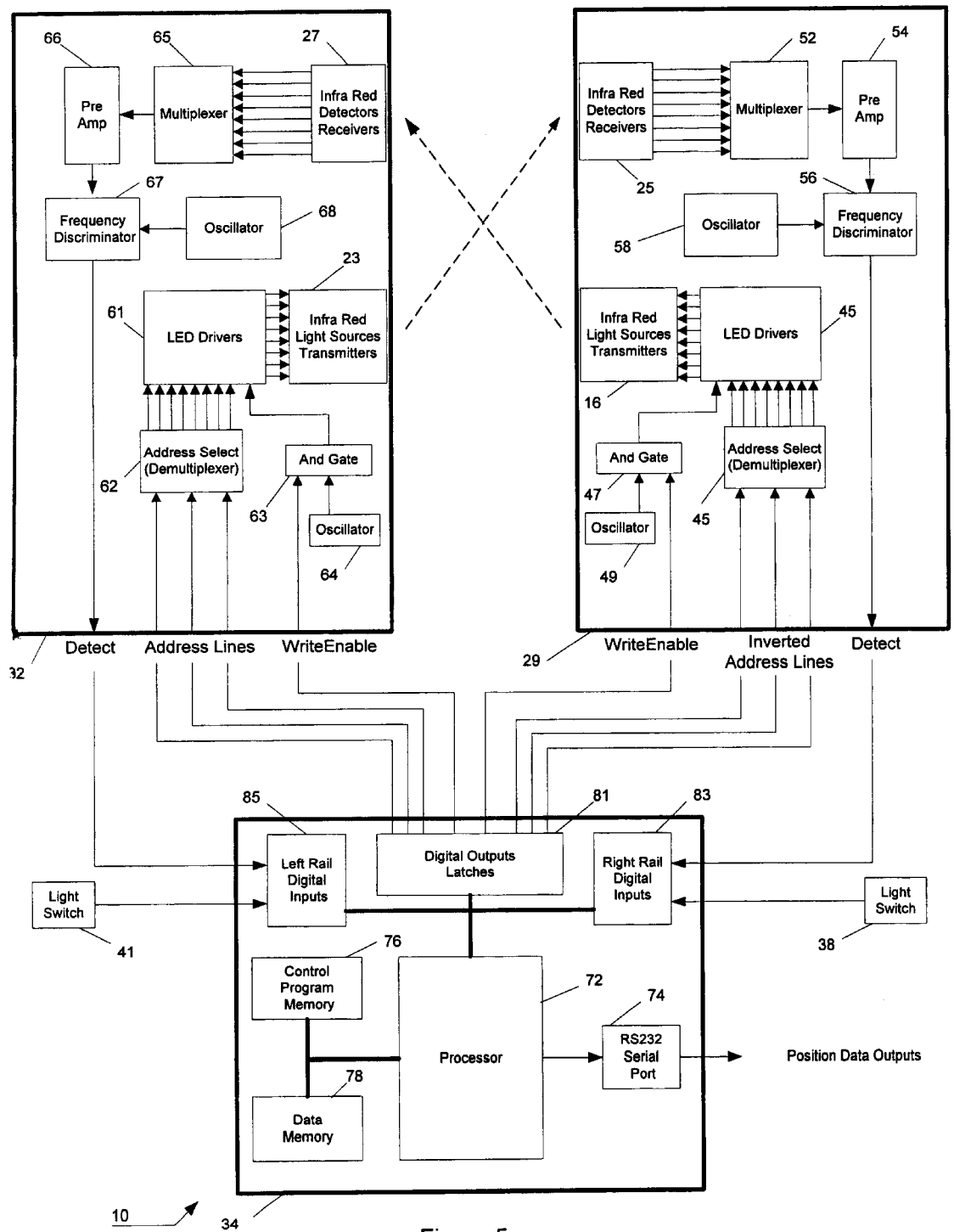
FIG. 5 is a functional block diagram of the apparatus of FIG. 3.

Referring now to FIG. 5, the infra red light source and detector printed circuit assembly 29 generally comprises light emitting diode drivers 43 for energizing selectively the infra red light source transmitters 21 of the row 16 under the control of an address select 45 which de-multiplexes the inverted address lines from the assembly 34. An AND gate 47 synchronizes the drivers 43 under the control of an oscillator 49 in the presence of a write enable signal from the control assembly 34.

A multiplexer 52 receives the data from the infra red detector receivers 25, and the output of the multiplexer 52 is amplified by a pre-amplifier 54. A frequency discriminator 56 controlled by a synchronized oscillator 58 generates a detect signal for the control assembly 34.

Considering now the assembly 32 in greater detail with reference to FIG. 5, the assembly 32 includes a light emitter diode driver 61 for selectively energizing the infra red light source transmitters 23 in a similar manner as the drivers 43 selectively energize the transmitters 21. An address select 62 de-multiplexes the address lines from the control assembly 34 in a similar manner as the address select 45 de-multiplexes the inverted address lines from the assembly 34. An AND gate 63 and an oscillator 64 synchronizes the address data supplied to the drivers 61 under the control of a write enable signal from the control assembly 34.

A multiplexer 65 for the infra red detector receivers 27 generate a detect signal for the control assembly 34 via a pre-amplifier 66, and a frequency discriminator 67 controlled by a synchronized oscillator 68 in a similar manner as the corresponding components of the assembly 29.

Considering now the control assembly 34 in greater detail with reference to FIG. 5, the assembly 34 includes a processor 72 such as a suitable conventional microprocessor, for providing the address information for controlling the rail 18 and for providing inverted address information for controlling the rail 16. An RS 232 serial port 74 conveys output information from the processor 72 for position data output. A control program memory 76 and a data memory 78 are provided for the processor 72. A set of digital output latches 81 are utilized for receiving and temporarily storing the address information for the assemblies 29 and 32. A right and left rail digital inputs 83 and 85 receive the detect signals from the respective assemblies 29 and 32, as well as the sun blind switch information from the respective switches 38 and 41, if employed in place of the software pattern recognition.

Figure 6:
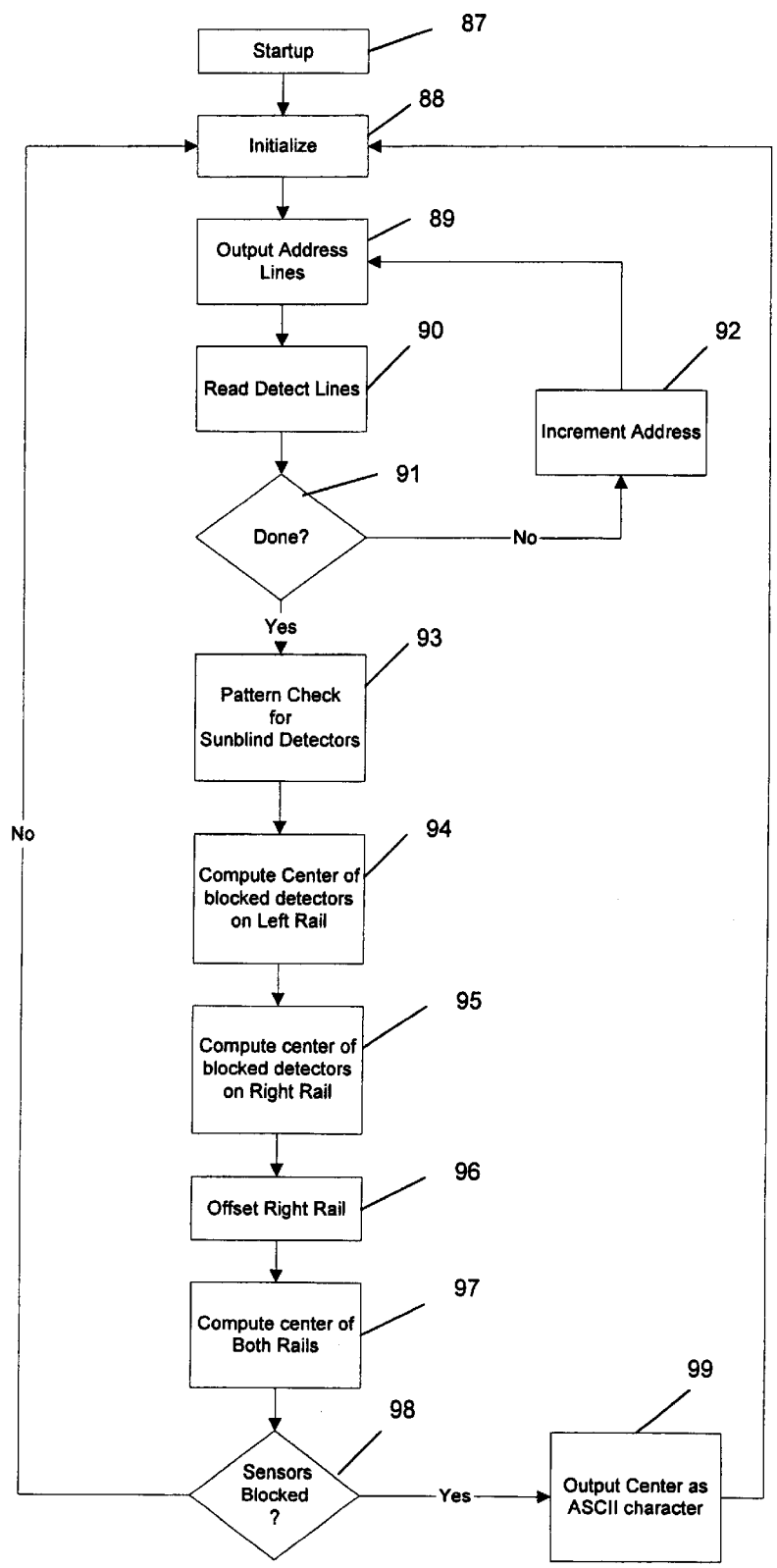
FIGS. 6 and 7 are flow chart diagrams of the control software of the apparatus of FIG. 3.

Considering now the control programs stored in the control program memory 76 with reference to FIG. 6, the program is initiated by a startup routine as indicated at box 87, and includes an initialization routine as indicated at 88. Thereafter, the output address lines are selectively enabled at 89, and then the read detect lines are accessed at 90.

A decision is then made at 91 to determine whether or not the entire sequence has been completed. If not, the next address is incremented as indicated at 92 to return to the box 89 for generating the output address lines for the next address. This loop continues until the entire sequence is completed, and then a pattern check for sun blind detectors is executed as indicated at 93, if this software approach is implemented in place of the switches 38 and 41. This routine will be described in greater detail with reference to FIG. 7.

After the check for sun blind detectors is completed, the processor 72 computes the center of the blocked detectors on the left rail 18 at 94. Thereafter, the processor computes the center of the blocked detectors on the right rail 16 as indicated at box 95.

Thereafter, an offset to the right rail is added at 96, and then the center point of both rows 16 and 18 are computed by the processor 72 as indicated at 97.

A decision is then made at 98 to determine whether or not any of the sensors or receivers are blocked. If none are blocked, then the program reverts to the initialization box 88. If there is a blockage, then the center coordinates of the blockage are then transmitted via the serial port 74, and the program reverts to the initialization box 88.

Figure 7:
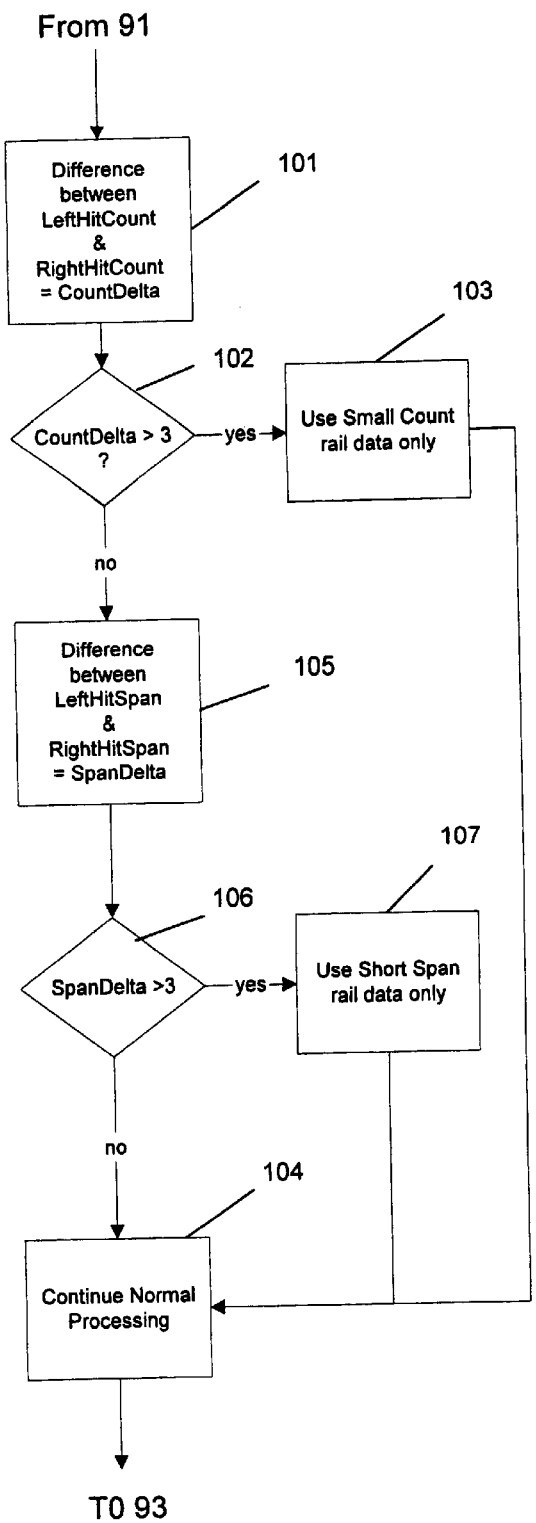

Considering now the pattern check for sunblinded receivers with reference to FIG. 7, if the decision at the box 91 is affirmative, then the processor 72 determines the difference between the left hit count and the right hit count. The difference is then determined to be the count delta. This is indicated at box 101. Thereafter, a decision is made at box 102 by the processor 72 as to whether or not the count delta is greater than three. If it is, then the processor 72 determines that the small count rail data should be used for both rails as indicated at 103, and then the routine advances to a continue normal processing box 104. If the count delta is not greater than three, then the processor 72 determines the difference between the left hit span and the right hit span as being equal to a span delta as indicated at 105. Thereafter, the processor 72 determines whether or not the span delta is greater than three as indicated at 106. If it is greater than three, then the processor 72 determines that the larger span rail is invalid, and thus the short span rail data should be used exclusively as indicated in 107, and thereafter the routine returns to the continue normal processing box 104. If the span delta is not greater than three, then the program advances directly to the continue normal processing box 104.

Figure 8:
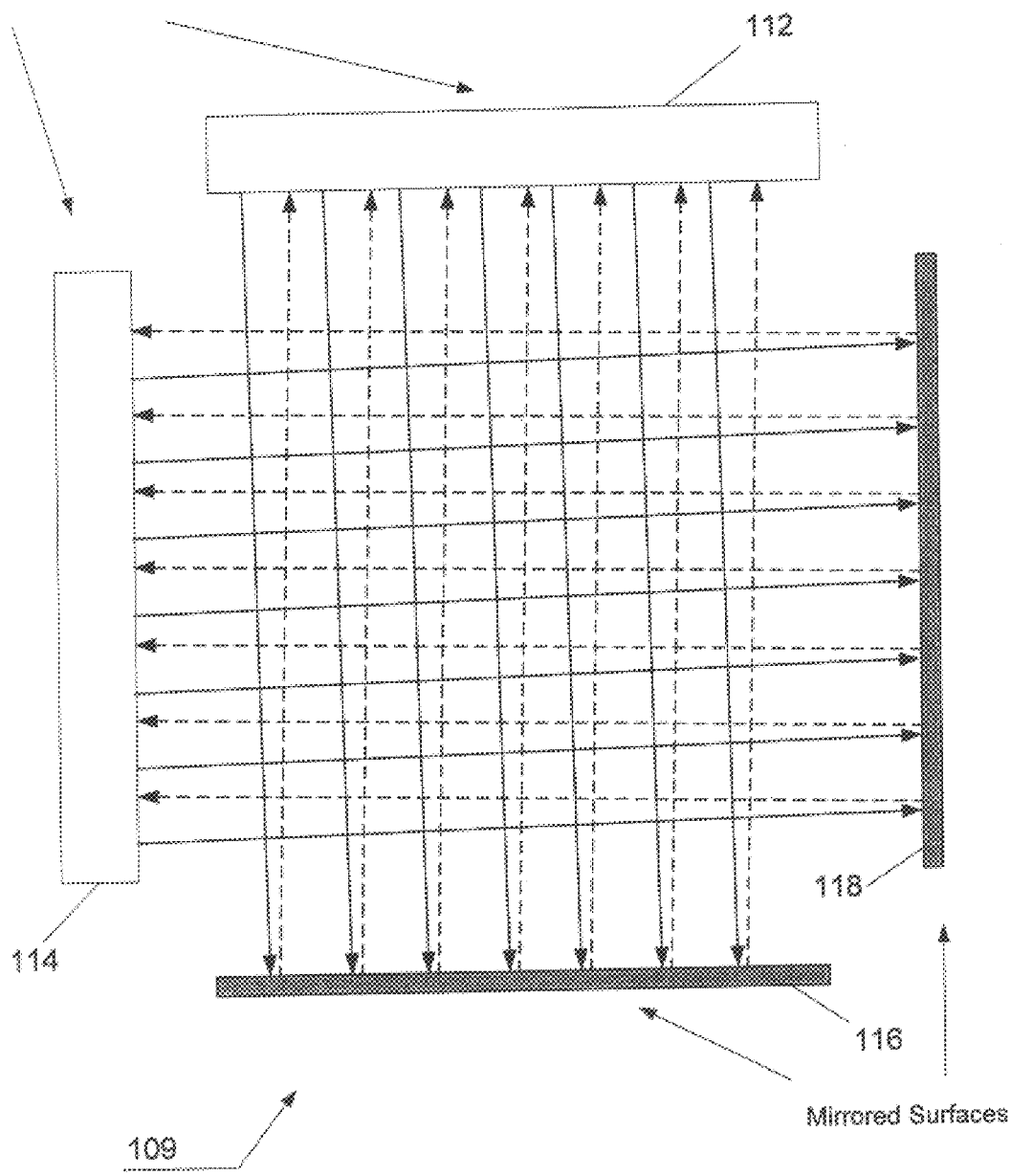
FIG. 8 is a diagrammatic view of another photoelectric sensing array apparatus, which is also constructed in accordance with the present invention.

Referring now to FIG. 8, there is shown another photoelectric sensing arrangement apparatus 109, which is also constructed in accordance with the present invention, and which is similar to the apparatus 10 except that the apparatus 109 is a two dimensional sensor array utilizing reflective surfaces to reflect the beams from transmitters to receivers. The apparatus 109 includes top and left hand infra red light source and detector printed circuit assemblies 112 and 114, which are positioned at right angles to one another, and which are similar in construction to the assemblies 29 and 32. A bottom mirrored surface 116 receives the infra red light beams from the assembly 112 and reflects them back to the assembly 112. Similarly, a right mirrored surface 118 is disposed oppositely to the assembly 114 and reflects the infra red beams from the assembly 104 back thereto. In this manner, there are both vertical and horizontal sensing axes to provide a two dimensional sensor array.

While particular embodiments of the present invention have been disclosed, it is to be understood that various different modifications are possible and are contemplated within the true spirit and scope of the appended claims. For example, while one and two dimensional arrays are disclosed, it will become apparent to the skilled in the art that three dimensional arrays may also be employed. There is no intention, therefore, of limitations to the exact abstract or disclosure herein presented.

What is claimed is:

1. Photoelectric sensing array apparatus, comprising:
    a pair of rails mounted in photoelectric communication with one another for detecting the presence of an opaque object disposed therebetween, each one of said rails including a row of alternating photoelectric transmitters and receivers;
    means for energizing and sensing one of said rails;
    means for energizing and sensing the other one of said rails;
    means responsive to the energizing and sensing of the pair of rails for determining the location of an opaque object disposed in the communication path between said rails and for supplying an address to one of said rails and an inverted address to the other one of said rails, said means including a processor; and
    means for sensing receiver saturation error conditions, and said processor being responsive to the sensing of said error conditions to utilize only the detected information from one of said rails;
    wherein said processor is adapted to determine the difference between the detected information from said pair of rails, and to cause the utilizing of only the detected information of one of said pair of rails, said one of said pair of rails having a smaller detected information.

2. Photoelectric sensing array apparatus according to claim 1, wherein said rails are disposed parallel and oppositely disposed relative to one another with one of said rails being disposed on one side and the other one of said rails being disposed directly opposite thereto.

3. Photoelectric sensing array apparatus according to claim 1, wherein the distance between adjacent transmitters and receivers is equal to one half of the transmitter height plus one half of the receiver diameter.

4. Photoelectric sensing array apparatus according to claim 1, wherein the processor is adapted to provide address information for controlling one of said rails and to provide inverted address information for controlling the other one of said rails.

5. Photoelectric sensing array apparatus according to claim 1, wherein said processor is adapted to determine the difference between detected spans of said pair of rails, and then to cause the utilizing only the detected information from one of said pair of rails, said one of said pair of rails having a shorter span.

6. Photoelectric sensing array apparatus according to claim 1, wherein said processor computes centers of blocked receivers of both rails and computes the center of both of said rails to determine the position of an opaque object.

7. A method of using a photoelectric sensing array apparatus, comprising:

arranging a pair of rails for communicating photoelectrically with one another, each one of said rails including a rail of alternating receivers and transmitters;

energizing and sensing one of said rails;

energizing and sensing the other one of said rails;

determining the location of an opaque object disposed in the communication path between said rails in response to the energizing and sensing of the rails; and determining the difference between the detected information from said pair of rails, and then causing the utilizing of only the detected information of one of said pair of rails, said one of said pair of rails having a smaller detected information.

8. A photoelectric sensing array system, comprising:

a first rail having a row of alternating transmitters and receivers;

a second rail having a row of alternating transmitters and receivers, each of said receivers of said second rail adapted to receive a photoelectric signal from a corresponding one of said transmitters of said first rail, and each of said receivers of said first rail adapted to receive a photoelectric signal from a corresponding one of said transmitters of said second rail; and a processor adapted to determine a first number indicative of number of receivers in said first rail receiving a signal and a second number indicative of number of receivers in said second rail receiving a signal;

wherein when a difference between said first number and second number is greater than a predetermined threshold, said processor is adapted to use signals received by receivers of only one rail to detect an opaque object, said one rail corresponding to the lower of the first number and the second number.

9. A method of detecting an opaque object, comprising:

transmitting signals from transmitters mounted on a first rail, said transmitters being mounted alternatingly with receivers on said first rail, said signals being directed at receivers mounted on a second rail, said receivers on said second rail being mounted alternatingly with transmitters on said second rail;

transmitting signals from said transmitters mounted on said second rail, said signals being directed at said receivers mounted on said first rail;

determining a first number indicative of number of said receivers in said first rail receiving a signal;

determining a second number indicative of number of said receivers in said second rail receiving a signal;

calculating a difference between said first number and second number;

determining whether said difference is greater than a predetermined threshold; and when said difference is greater than said predetermined threshold, using only received signals from one rail to determine the existence of an opaque object between said first rail and said second rail.

* * * * *